United States Patent
Kruglick

(10) Patent No.: US 10,169,211 B2
(45) Date of Patent: *Jan. 1, 2019

(54) APPLICATION PROGRAMMING INTERFACE TESTING SERVICES

(71) Applicant: EMPIRE TECHNOLOGY DEVELOPMENT LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/462,994

(22) Filed: Mar. 20, 2017

(65) Prior Publication Data

US 2017/0192881 A1    Jul. 6, 2017

Related U.S. Application Data

(63) Continuation of application No. 13/700,417, filed as application No. PCT/US2012/035042 on Apr. 25, 2012, now Pat. No. 9,600,402.

(51) Int. Cl.
*G06F 11/36* (2006.01)

(52) U.S. Cl.
CPC ...... *G06F 11/3676* (2013.01); *G06F 11/3672* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | |
|---|---|---|
| 6,662,217 B1 | 12/2003 | Godfrey et al. |
| 7,743,090 B1 | 6/2010 | Gibson et al. |
| 7,743,244 B2 | 6/2010 | Warden et al. |
| 8,539,475 B2 | 9/2013 | Ershov |

(Continued)

FOREIGN PATENT DOCUMENTS

| | | |
|---|---|---|
| CN | 102204167 A | 9/2011 |
| WO | 2010048746 A1 | 5/2010 |

OTHER PUBLICATIONS

"Open source software for building private and public clouds," Openstack Cloud Software, accessed at https://web.archive.org/web/20120420172046/http://www.openstack.org/, archived on Apr. 20, 2012, accessed on Mar. 14, 2017, pp. 3.

(Continued)

*Primary Examiner* — Syed A Roni

(57) ABSTRACT

Technologies and implementations for providing an application programming interface (API) testing services for transferring data center services. In some examples, multiple API calls used by a service at an origin data center are converted into respective test segments. An API test module including each of the test segments is formed for a multiple number of target data centers and the API test module is transmitted from the origin data center to the target data centers for execution at the target data centers. One or more test results based at least in part on the transmitted API test module being executed at the target data centers are received, and a report based on the one or more test results that indicates which of the application programming interface calls from the origin data center are compatible with the target data centers is generated.

21 Claims, 5 Drawing Sheets

(56) References Cited

U.S. PATENT DOCUMENTS

| | | |
|---|---|---|
| 8,862,950 B1 | 10/2014 | Ginsberg et al. |
| 2002/0078259 A1 | 6/2002 | Wendorf et al. |
| 2005/0187930 A1 | 8/2005 | Subramanian et al. |
| 2007/0006036 A1 | 1/2007 | Devas et al. |
| 2009/0225676 A1 | 9/2009 | Kisela et al. |
| 2010/0180344 A1 | 7/2010 | Malyshev et al. |
| 2010/0235823 A1 | 9/2010 | Garbers et al. |
| 2010/0332818 A1 | 12/2010 | Prahlad et al. |
| 2011/0035629 A1 | 2/2011 | Noller et al. |

OTHER PUBLICATIONS

Baillie, P., "Rackspace Cloud API compatibility added by CloudSigma," accessed at http://web.archive.org/web/20110518042231/http://www.cloudsigma.com/about-us/press-releases/175, Sep. 27, 2010, pp. 2.

International search report and written opinion of the international searching authority for PCT/US2012/035042 dated Jul. 19, 2012, pp. 9.

Leong. L., "Are multiple cloud APis bad?," Gartner, accessed at https://web.archive.org/web/20160410114006/http://blogs.gartner.com/lydia_leong/2009/08/27/are-multiple-cloud-apis-bad/, accessed on Aug. 27, 2009, pp. 4.

600 A computer program product

602 A signal bearing medium

604 Machine-readable instructions that, when executed, cause a device to provide an application programming interface testing service by:

determining a plurality of application programming interface calls used by a service at an origin data center;
    converting each of the plurality of application programming interface calls into a test segment to generate a plurality of test segments;
    forming an application programming interface test module for a target data center, the application programming interface test module including each of the plurality of test segments;
    transmitting the application programming interface test module to the target data center for execution at the target data center;
    receiving one or more test results based at least in part on the transmitted application programming interface test module being executed at the target data center;
    transmitting the application programming interface test module to the target data center for execution at the target data center;
    receiving one or more test results based at least in part on the transmitted application programming interface test module being executed at the target data center, wherein the application programming interface test module includes a hypertext transfer protocol get request and the one or more test results includes an indication that the hypertext transfer protocol get request was successful; or
    comparing the one or more test results to one or more second test results received from a second target data center.

| 606 a computer-readable medium | 608 a recordable medium | 610 a communications medium |

Fig. 6

APPLICATION PROGRAMMING INTERFACE TESTING SERVICES

CROSS-REFERENCE TO RELATED APPLICATIONS

The present application is a continuation under 35 U.S.C. § 120 of U.S. patent application Ser. No. 13/700,417, filed Nov. 27, 2012, now U.S. Pat. No. 9,600,402, which is a U.S National Stage filing under 35 U.S.C. § 371 of International Application No. PCT/US12/35042, filed Apr. 25, 2012 and entitled "APPLICATION PROGRAMMING INTERFACE TESTING SERVICES." U.S. patent application Ser. No. 13/700,417 and International Application No. PCT/US12/35042, including any appendices or attachments thereof, are incorporated by reference herein in their entirety.

BACKGROUND

Unless otherwise indicated herein, the approaches described in this section are not prior art to the claims in this application and are not admitted to be prior art by inclusion in this section.

In a customer's data center deployment, a variety of application programming interface calls may be used. In general, when transferring from one data center to another, it may be useful to know which application programming interface calls in use at the origin data center may be available at the destination data center, and which application programming interface calls may not be available. In general, it may be difficult to determine which application programming interface calls may be in use at the origin data center.

SUMMARY

In various embodiments, the present disclosure describes example methods for providing an application programming interface testing service. Example methods may include determining application programming interface calls used by a service at an origin data center, converting each of the application programming interface calls into a test segment to generate test segments, and forming an application programming interface test module for a target data center, the application programming interface test module including the plurality of test segments.

In various embodiments, the present disclosure also describes example machine readable non-transitory media. Example machine readable non-transitory media may include instructions that, when executed, cause a device to provide an application programming interface testing service by determining application programming interface calls used by a service at an origin data center, converting each of the application programming interface calls into a test segment to generate test segments, and forming an application programming interface test module for a target data center, the application programming interface test module including the plurality of test segments.

In various embodiments, the present disclosure also describes example devices. Example devices may include a machine readable medium having instructions that, when executed, cause the device to provide an application programming interface testing service by determining application programming interface calls used by a service at an origin data center, converting each of the application programming interface calls into a test segment to generate test segments, and forming an application programming interface test module for a target data center, the application programming interface test module including the plurality of test segments, and a processor coupled to the machine readable medium to execute the instructions.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 6 illustrates an example computer program product; and

DETAILED DESCRIPTION

Figure 1:
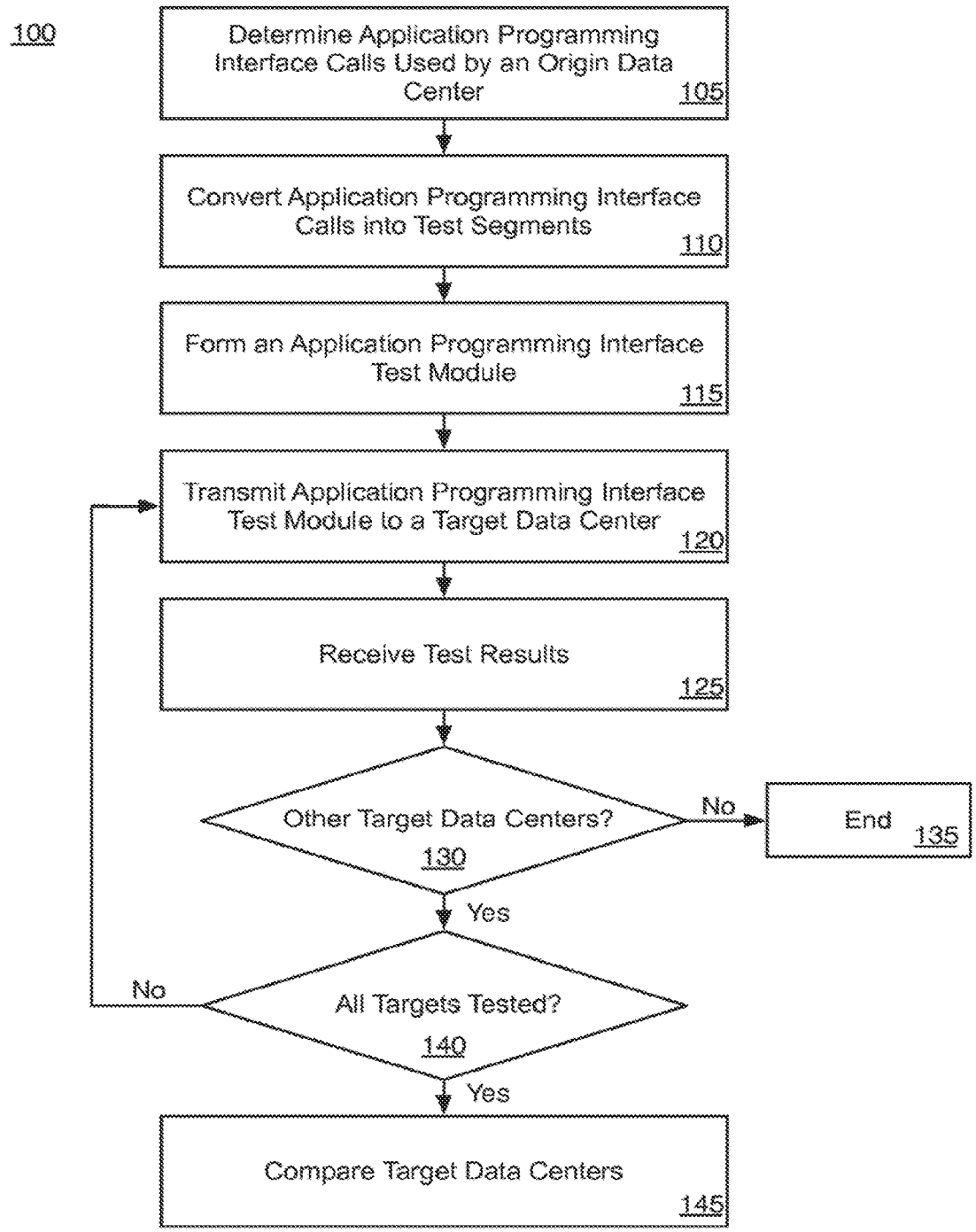
FIG. 1 illustrates a flow diagram of an example method for providing an application programming interface testing service.

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer readable media related to providing an application programming interface testing service for transferring data center services.

In general, a data center customer may utilize a service at the data center. The service may include a variety of sub-services, such as data storage, telecommunications, data center based applications, hosted applications, or the like. In some examples, the applications or their software components may utilize application programming interface (API) calls and/or a web service protocol such as simple object access protocol (SOAP) or representational state transfer (REST). In general, an API may provide a specification for use by applications or application components indicating available functions or processes, or the like. An API call may include a call, such as a command (with or without arguments and/or other relevant data), that may invoke one or more functions or processes indicated as supported by the API. In some examples, a web service protocol may provide a protocol for exchanging structured information including API calls.

Further, in some instances, a data center customer may seek to move from one data center to another for lower cost or better service, or the like. As will be appreciated, when a data center customer moves from one data center to another, it may be difficult to predict what API calls may be in use at the origin data center (i.e., the customer's current data center) and, further, which API calls may be supported at a target data center or data centers (i.e., data center or centers to which the customer may be considering a move). In general, the embodiments discussed herein may provide for an application programming interface testing service such that a data center customer may determine API calls used in their service and generate a test module to test at least some of those API calls at one or more target data centers. In some examples, an origin data center or a third party computing device may transmit the test module to a target data center and may receive test results based on the test module being executed at the target data center. Based on the test results, a data center customer may better evaluate a potential data center move and may better evaluate potential target data centers. In some examples, the discussed application programming interface testing service may be performed by a third party service provider such as a data center services broker, or the like. The discussed application programming interface testing service may provide a user certainty as to which programs, applications, or other sub-services may run at a destination data center which may remove fear, uncertainty or doubt regarding a data center transfer. Further, with programs, applications, or other sub-services that may not be fully supported at a destination data center, the customer may employ contingency planning, such as software upgrades, or the like to ensure a smooth transfer.

FIG. 1 illustrates a flow diagram of an example method 100 for providing an application programming interface testing service, arranged in accordance with at least some embodiments of the present disclosure. In general, method 100 may be performed by any suitable device, devices, or systems such as those discussed herein. In some examples, method 100 may be performed by a data center. In some examples, method 100 may be performed by a data center resource or resources. In some examples, method 100 may be performed by a virtual machine, a data center cluster, one or more network processors, one or more routers, gateway systems, data loss prevention systems, or the like. In some examples, method 100 may be performed by a virtual machine of a data center. In some examples, method 100 may be performed by a third party resource such as a third party computing device, or the like.

Method 100 sets forth various functional blocks or actions that may be described as processing steps, functional operations, events and/or acts, etc., which may be performed by hardware, software, and/or firmware. Numerous alternatives to the functional blocks shown in FIG. 1 may be practiced in various implementations. For example, intervening actions not shown and/or additional actions not shown may be employed and/or some of the actions shown may be eliminated, without departing from the scope of claimed subject matter. Method 100 may include one or more of functional operations as indicated by one or more of blocks 105, 110, 115, 120, 125, 130, 135, 140, and/or 145. The process of method 100 may begin at block 105.

At block 105, "Determine Application Programming Interface Calls Used by an Origin Data Center", one or multiple of application programming interface calls used by an origin data center service may be determined. In general, the one or multiple of application programming interface calls used by a service at an origin data center may be determined using any suitable technique or techniques. In some examples, the one or multiple of application programming interface calls used by the origin data center may be determined by extracting application interface calls from messages captured at network processors, as is discussed further with respect to FIG. 2 and elsewhere herein. In some examples, the one or multiple of application programming interface calls used by the origin data center may be determined by evaluating a code repository to detect the application programming interface calls, as is discussed further with respect to FIG. 3 and elsewhere herein.

In general, the application programming interface calls may include any application programming interface calls. As discussed, in some examples, an application programming interface call may include a call, such as a command (with our without arguments and/or other relevant data), that may invoke one or more functions or processes indicated as supported by the application programming interface. In some examples, the application programming interface calls may include a hypertext transfer protocol get request, a hypertext transfer protocol put request, a key-value store command, a messaging call, a queuing call, a remote storage call, a delivery to a content delivery network request, a management command to a content delivery network, or the like. In some examples, an application programming interface call may be implemented using the simple object access protocol (SOAP). In general, the simple object access protocol may provide a structure for exchanging information and may rely on extensible markup language (XML) or JavaScript Object Notation (JSON) or the like for its message format. In some examples, an application programming interface call may be implemented using representational state transfer (REST), which may provide a software architecture for distributed systems.

In general, any number of application programming interface calls may be used by a customer service at a data center. In some examples, the number of application programming interface calls used by a customer service may be in the range of about 100 to about 1,000. In some examples, the number of application programming interface calls used by a customer service may be in the range of about 1,000 to about 10,000. Determining the application programming interface calls used in the origin data center may provide a list or database of the mix of application programming interface calls utilized by in use applications of the customer's service. In some examples, the mix of application programming interface calls utilized by in use applications, even if known at the time of set up of the customer service, may change over time as new applications, programs, or other sub-services may be added over time.

In general, the service at the origin data center may include any suitable customer service or services and may include a single service, a variety of sub-services, one or more virtual machines, or the like. In some examples, the service may include an in-use application. In some examples, the service may include one or more data center based applications, one or more hosted applications, one or more data storage services, one or more telecommunication services, or the like. In some examples, customer service at a data center may be considered a customer deployment, a data center deployment, a cloud computing deployment, or the like. The process of method 100 may continue at block 110.

At block 110, "Convert Application Programming Interface Calls into Test Segments", one or more of the application programming interface calls may be converted into test segments. In some examples, each of the multiple application programming interface calls may be converted into a test segment to generate a multiple number of test segments. In some examples, some application programming interface calls may be combined into a single test segment. In some examples, one application programming interface call may be separated into two or more test segments. As is discussed further herein, in some examples, duplicate application programming interface calls may be discarded and test segments may be generated only for substantially unique application programming interface calls. In general, the test segments may include any suitable test segments. In some examples, a test segment may include an application programming interface setup call. In some examples, a test segment may include an application programming interface call within an error detecting loop configured to record whether the application programming interface call executed correctly or returned an error. In some examples, a test segment may include an application programming interface call within an error detecting loop including a header and/or a footer, such that the error detecting loop may be configured to record whether the application programming interface call executed correctly or returned an error.

As discussed, in some examples, a test segment may include an application programming interface call converted to a test segment by calling it within an error-detecting loop of code that may record whether the application programming interface call executed correctly, returned an error, or in any way does not return confirmation, or the like. In some examples, the test segment may include a header or footer or may utilize error detecting code particular to a target data center. Sample code (1) below illustrates an example test segment that may write test results to a console (in practice, the test result may be written to a report file, for example).

```
catch (Exception ex)
{
    Console.WriteLine("Caught Exception: " + ex.Message);
    Console.WriteLine("Response Status Code: " + ex.StatusCode);
    Console.WriteLine("Error Code: " + ex.ErrorCode);
    Console.WriteLine("Error Type: " + ex.ErrorType);
    Console.WriteLine("Request ID: " + ex.RequestId);
    Console.WriteLine("XML: " + ex.XML);
}
(1)
```

In some examples, for successful application programming interface calls, the test segment may capture further information such as elapsed time taken to execute, or the like, such that direct comparisons between the origin data center and the target data center may be made. The process of method 100 may continue at block 115.

At block 115, "Form an Application Programming Interface Test Module", an application programming interface test module may be formed based on the test segments. In general, the application programming interface test module may be formed using any suitable technique or techniques. In some examples, the application programming interface test module may include each of the multiple test segments discussed above. In some examples, the application programming interface test module may be intended for one or more target data centers, as is discussed further herein. In some examples, the application programming interface test module may be considered a compatibility test program, a compatibility test module, or the like. In some examples, the application programming interface test module may provide for substantially quick testing of one or more target data centers. Sample pseudo-code (2) illustrates an example portion of a test module.

```
for each (APIs_to_test)
{
    Record API under test in report;
    Send API test message;
    Wait a reasonable time if no response is received;
    Catch any errors [e.g., code (1) shown above] or record functional
    response;
    Record end of API test in report;
    Get next API to test;
}
(2)
```

As discussed, in some examples, pseudo-code (2) or similar may be utilized to form a test module. As is discussed below with respect to block 120, in some examples, the test module may be transmitted in its entirety for testing at a test module. In other examples, each test segment may be transmitted to a target data center for testing. In some examples, the test segments may be transmitted as simple object access protocol messages. In some examples, a group or subset of test modules may be transmitted to a target data center for testing. The process of method 100 may continue at block 120.

At block 120, "Transmit Application Programming Interface Test Module to a Target Data Center", the application programming interface test module may be transmitted to one or more target data centers for execution at the one or more target data centers. In some examples, the application programming interface test module may be transmitted to a single target data center. In some examples, as discussed further below with respect to decision block 130 and elsewhere herein, the application programming interface test module may be transmitted to multiple target data centers such that the target data centers may be compared. In some examples, the application programming interface test module may be transmitted to multiple target data centers simultaneously or substantially simultaneously. In general, the application programming interface test module may be transmitted using any suitable technique or techniques using any suitable communications channel. In some examples, the application programming interface test module may be transmitted over the internet. In some examples, the application programming interface test module may be transmitted over a virtual private network (VPN). As discussed, in some examples, test segments or groups of test segments may be separately transmitted to one or more target data centers for testing. The process of method 100 may continue at block 125.

At block 125, "Receive Test Results", one or more test results may be received. In some examples, the one or more test results may be received based at least in part on the transmitted application programming interface test module being executed at the target data center. In some examples, the one or more test results may be received after the application programming interface test module has run at the one or more target data centers. In general, the one or more test results may be received using any suitable technique or techniques and over any suitable communications channel. In some examples, the one or more test results may be received over the internet or a virtual private network, or the like. In general, the one or more test results may include test results in any suitable format. In some examples, the test results may include multiple test results corresponding to the multiple test segments that may make up the application programming interface test module. In some examples, the test results may include a test report. In some examples, the test report may include a test result for each of the multiple test segments. In general, the test results may include any suitable test results for the discussed test segments. In some examples, the test results may indicate whether a test segment executed successfully. In some examples, the test results may indicate whether a test segment failed. In some examples, the test results may indicate whether a test segment returned an error. As discussed, in some examples, the application programming interface test module may include a hypertext transfer protocol get request. In such examples, the test results may include an indication indicating whether the hypertext transfer protocol get request was successful. The process of method 100 may continue at decision block 130.

At decision block 130, "Other Target Data Centers?", it may be determined whether other target data centers are to be tested with the application programming interface test module. If other target data centers are not to be tested (i.e., only one target data center is being tested), the process of method 100 may end, as shown at block 135, "End". If other target data centers are to be tested, the process of method 100 may continue at decision block 140.

At decision block 140, "All Targets Tested?", it may be determined whether all of the target data centers have been tested. If all of the target data centers have not been tested, the process of method 100 may continue at block 120 and the process may continue as described again until all of the target data centers to be tested may have completed testing such that each target data center to be tested may have received and executed the application programming interface test module and the test results for each target data center may have been received. If all of the target data centers have been tested, the process of method 100 may continue at block 145.

At block 145, "Compare Target Data Centers", the tested target data centers may be compared. In general, the tested target data centers may be compared using any suitable technique or techniques. In some examples, the tested target data centers may be compared to determine which data center may support the greatest number of application programming interface calls. In some examples, the tested target data centers may be compared to determine which data center may support any number of priority application programming interface calls.

As discussed, the process of method 100 may be utilized to test and compare any number of target data centers. In some examples, an application programming interface test module may be transmitted to a first target data center for execution at the first target data center, first test results may be received based on the transmitted application programming interface test module being executed at the first target data center, the application programming interface test module may be transmitted to a second target data center for execution at the second target data center, and/or second test results may be received based on the transmitted application programming interface test module being executed at the second target data center. In a similar manner, the application programming interface test module may be transmitted to any number of target data centers for execution, and any number of test results may be received from the target data centers for comparison.

As discussed, the process of method 100 may return test results from one or more target data centers. In some examples, the test results may indicate whether various application programming interface calls were executed successfully, failed, or reported errors, or the like. In some examples, any reported errors may be further examined or probed to determine more detail about the error. In some examples, the error may indicate an application programming interface call may not be supported. In some examples, the error may indicate the application programming interface call may be supported but a piece of data may not have been passed correctly by the application programming interface call. In some examples, the error may indicate the application programming interface call may be supported but that a piece of data may not have been available at the destination data center. Such further details and evaluation may indicate support for one or more application programming interface calls and that the code may only need to be updated or that necessary data may need to be provided at the data center, or the like.

Figure 2:
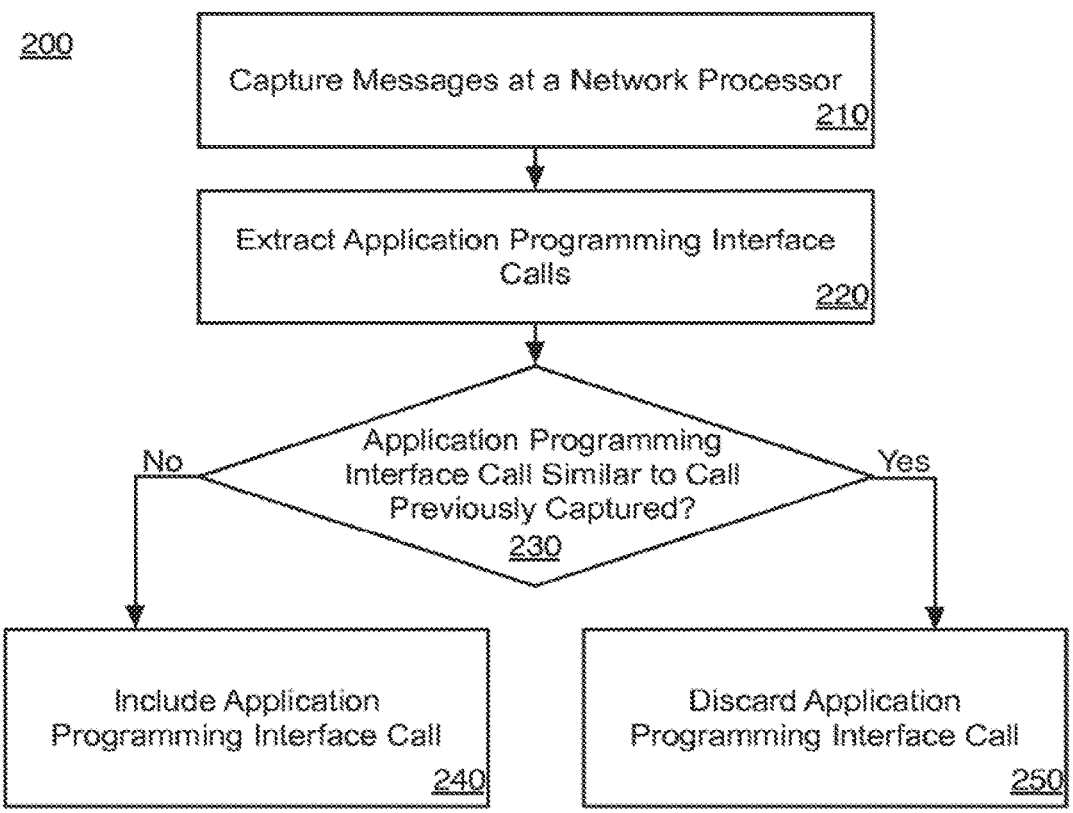
FIG. 2 illustrates a flow diagram of an example method for determining application programming interface calls used by a service at an origin data center.

FIG. 2 illustrates a flow diagram of an example method 200 for determining application programming interface calls used by a service at an origin data center, arranged in accordance with at least some embodiments of the present disclosure. In general, method 200 may be performed by any suitable device, devices, or systems such as those discussed herein. In some examples, method 200 may be performed by a data center. In some examples, method 200 may be performed by a data center resource or resources. In some examples, method 200 or portions of method 200 may be performed by a virtual machine, a data center cluster, one or more network processors, one or more routers, gateway systems, data loss prevention systems, or the like. In some examples, method 200 may be performed by a virtual machine of a data center. In some examples, method 200 may be performed by an origin data center.

Method 200 sets forth various functional blocks or actions that may be described as processing steps, functional operations, events and/or acts, etc., which may be performed by hardware, software, and/or firmware. Numerous alternatives to the functional blocks shown in FIG. 2 may be practiced in various implementations. For example, intervening actions not shown and/or additional actions not shown may be employed and/or some of the actions shown may be eliminated, without departing from the scope of claimed subject matter. Method 200 may include one or more of functional operations as indicated by one or more of blocks 210, 220, 230, 240, and/or 250. The process of method 200 may begin at block 210.

At block 210, "Capture Messages at a Network Processor", multiple messages may be captured at a network processor. In general, any suitable messages may be captured at the network processor. In some examples, the captured messages may include an in-operation network message. In some examples, the captured messages may include a simple object access protocol (SOAP) message. In some examples, the captured messages may include a representational state transfer (REST) message. In general, the messages may be captured using any suitable technique or techniques. In some examples, network messages may be snooped to detect whether a network message may have an application programming interface call. In some examples, network messages may be evaluated at full line speed. In some examples, network messages may be handled by an added service handler or the like, which may evaluate the messages either serially or in batches. In general, network messages may be evaluated over any time frame to collect application programming interface calls. In some examples, network messages may be evaluated over days, weeks, or months. In general, network messages may be evaluated over a duration that may capture as much usage as necessary to capture both commonly used and seldom used application programming interface calls. As discussed, in some examples, messages may be captured at one or more network processors. In some examples, messages may be captured at a router, at dedicated hardware, at a gateway system, or a data loss prevention system, or the like. The process of method 200 may continue at block 220.

At block 220, "Extract Application Programming Interface Calls", application programming interface calls may be extracted from the captured messages. In general, the application programming interface calls may be extracted using any suitable technique or techniques. In some examples, the application programming interface calls may be extracted from a simple object access protocol message. In some examples, the application programming interface calls may be extracted, copied and transferred to another process for inclusion in a list of application programming interface calls used by a customer's service or for a determination of whether the application programming interface calls has previously been included in a list of the application programming interface calls used by a customer's service, as is further discussed below. The process of method 200 may continue at decision block 230.

At decision block 230, "Application Programming Interface Call Similar to Call Previously Captured?", it may be determined whether the extracted application programming interface call may be substantially similar to or the same as an already captured and/or extracted application programming interface call. In general, it may it may be determined whether the extracted application programming interface call may be substantially similar to or the same as an already captured and/or extracted application programming interface call by any suitable technique or techniques. In some examples, the similarity may be based on a comparison of the application programming interface call to a list or database of previously captured and/or extracted calls. In some examples, the similarity may be based on a comparison of the programming code of the captured and/or extracted application programming interface calls. In general, the determination of whether the application programming interface call is similar to a previous application programming interface call may err on the side of including application programming interface calls. If it determined the application programming interface call is substantially similar to or the same as a previously captured and/or extracted call, the process of method 200 may continue at block 250, "Discard Application Programming Interface Call", such that the application programming interface call may be discarded. If it determined the application programming interface call is not substantially similar to or the same as a previously captured and/or extracted call, the process of method 200 may continue at block 240.

At block 240, "Include Application Programming Interface Call", the extracted application programming interface calls may be included in the application programming interface calls used at the origin data center. In some examples, the application programming interface calls used may be used by a customer having a service at an origin data center, as discussed herein. In general, the application programming interface calls may be included in the application programming interface calls used using any suitable technique or techniques. In some examples, the application programming interface calls may be added to a list of application programming interface calls, a database of application programming interface calls, or the like.

As discussed, the process of method 200 includes a comparison of captured and/or extracted application programming interface calls to previously captured and/or extracted application programming interface calls. In some examples, such a comparison may be omitted such that all captured and/or extracted application programming interface calls may be included as discussed with respect to block 240. In some examples, the list of all captured and/or extracted application programming interface calls may be subsequently reduced to remove duplicates.

Figure 3:
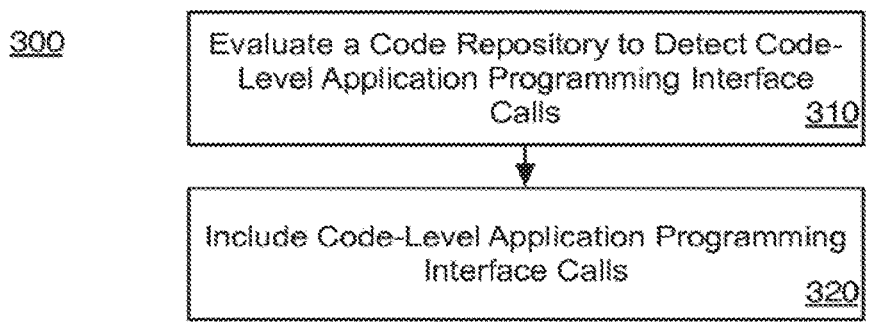
FIG. 3 illustrates a flow diagram of an example method for determining application programming interface calls used by a service at an origin data center.

FIG. 3 illustrates a flow diagram of an example method 300 for determining application programming interface calls used by a service at an origin data center, arranged in accordance with at least some embodiments of the present disclosure. In general, method 300 may be performed by any suitable device, devices, or systems such as those discussed herein. In some examples, method 300 may be performed by a data center. In some examples, method 300 may be performed by a data center resource or resources. In some examples, method 300 may be performed by a virtual machine, a data center cluster, one or more network processors, one or more routers, gateway systems, data loss prevention systems, or the like. In some examples, method 300 may be performed by a virtual machine of a data center. In some examples, method 300 may be performed by an origin data center.

Method 300 sets forth various functional blocks or actions that may be described as processing steps, functional operations, events and/or acts, etc., which may be performed by hardware, software, and/or firmware. Numerous alternatives to the functional blocks shown in FIG. 3 may be practiced in various implementations. For example, intervening actions not shown and/or additional actions not shown may be employed and/or some of the actions shown may be eliminated, without departing from the scope of claimed subject matter. Method 300 may include one or more of functional operations as indicated by one or more of blocks 310 and/or 320. The process of method 300 may begin at block 310.

At block 310, "Evaluate a Code Repository to Detect Code-Level Application Programming Interface Calls", a code repository may be evaluated to detect code-level application programming interface calls. In general, the code repository may be evaluated to detect code-level application programming interface calls using any suitable technique or techniques. In some examples, evaluating the code repository may include textual search of the code repository for application programming interface calls or code representative of application programming interface calls, or the like. The process of method 300 may continue at block 320.

At block 320, "Include Code-Level Application Programming Interface Calls", the code-level application programming interface calls may be included in the application programming interface calls used at the origin data center. In some examples, the application programming interface calls used may be used by a customer having a service at an origin data center, as discussed herein. In general, the application programming interface calls may be included in the application programming interface calls used using any suitable technique or techniques. In some examples, the application programming interface calls may be added to a list of application programming interface calls, a database of application programming interface calls, or the like.

As discussed, method 200 may include capturing and/or extracting application programming interface calls and method 300 may include evaluating a code repository to detect application programming interface calls. In some examples, the processes of method 200 and method 300 may be combined to determine the application programming interface calls used by a customer's service at a data center. In some examples, the process of method 200 may be performed first. In some examples, the process of method 300 may be performed first. In some examples, the processes may be performed simultaneously or substantially simultaneously. As discussed with respect to method 200, in some examples, duplicate application programming interface calls may be removed from the list of in use application programming interface calls used by the customer's service.

The above techniques describe methods for determining application programming interface calls used by a customer's service at a data center. In some examples, the described techniques may use message duplication and low level access to determine general application programming interface calls, such that programming libraries or custom code for each data center may not be required. Such techniques may offer the advantages of low cost, speed, and scalability. Further, the determined list of application programming interface calls used by a customer's service (or the services of multiple customers) at a data center may be useful for a variety of purposes such as, for example, as a source for other data centers to check if they support widely used application programming interface calls, to improve upon support of performance of widely used application programming interface calls, or the like.

Figure 4:
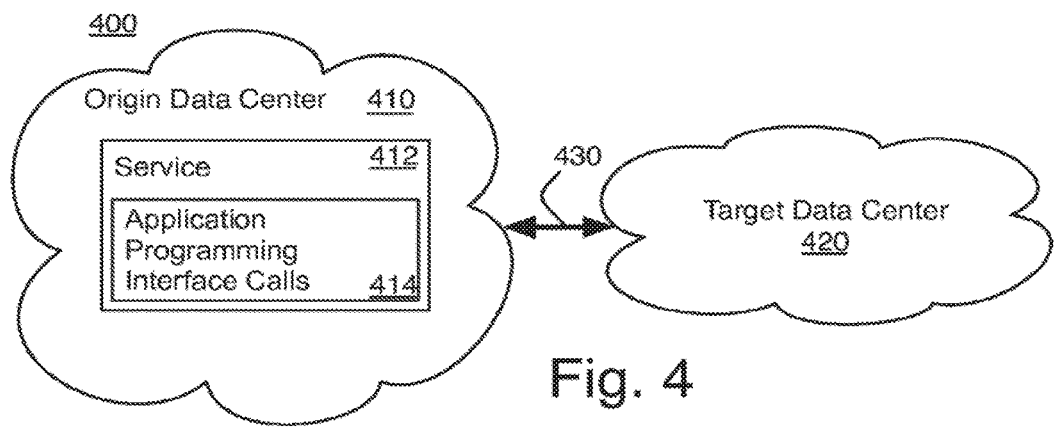
FIG. 4 illustrates a block diagram of an example system for providing an application programming interface testing service.

FIG. 4 illustrates a block diagram of an example system 400 for providing an application programming interface testing service, arranged in accordance with at least some embodiments of the present disclosure. As shown, system 400 may include an origin data center 410 having a service 412 including application programming interface calls 414. System 400 may also include a target data center 420 in communication with origin data center 410 by a connection 430.

In general, origin data center 410 may include any suitable data center having service 412 for a customer, or multiple services for one or more customers. In some examples, origin data center 410 may include computers, servers, server systems, data storage systems, telecommunications systems, computing clusters, and/or ancillary environmental systems, or the like. In some examples, data center 410 may be implemented in a cloud computing environment. In some examples, data center 410 may include one or more network processors, one or more routers, gateway systems, data loss prevention systems, or the like. In some examples, data center 410 may include a database or databases that may serve as a repository for a code repository associated with service 412. In general, service 412 may be implemented at data center 410 in any suitable manner. As will be appreciated, origin data center 410 may include any number of services 412 corresponding to any number of customers serviced by the origin data center 410. In general, application programming interface calls 414 may include any application programming interface calls as discussed herein.

In general, target data center 420 may include any suitable data center that may execute an application programming interface test module as discussed herein. In some examples, target data center 420 may include computers, servers, server systems, data storage systems, telecommunications systems, computing clusters, network processors, databases, and/or ancillary environmental systems, or the like. In some examples, target data center 420 may be implemented in a cloud computing environment. In general, application programming interface test module may be executed at target data center 420 in any suitable manner. As shown, in some examples, system 400 may include one target data center. In some examples, system 400 may include multiple target data centers for testing, as discussed herein.

As shown, origin data center 410 and target data center 420 may be in communication via connection 430. In general, connection 430 may include any suitable communication connection. In some examples, the communicative connection may include a virtual private network (VPN) tunnel. In some examples, the communicative connection may include a management connection. In some examples, the communicative connection may be over the internet.

As discussed herein, in some examples, an application programming interface testing service may be provided. In some examples, the application programming interface testing service may be provided by at the origin data center. For example, application programming interface calls 414 used by service 412 may be determined at origin data center 410 using any of the techniques discussed herein, such as, for example, extraction from captured messages at a network processor (as discussed with respect to FIG. 2) and/or by evaluating a code repository (as discussed with respect to FIG. 3). In some examples, the application programming interface calls may be converted to test segments, an application programming interface test module may be formed, the application programming interface test module may be transmitted, and test results may be received at origin data center 410. In some examples, target data center 420 may receive and execute an application programming interface test module or test segments, as discussed herein.

Figure 5:
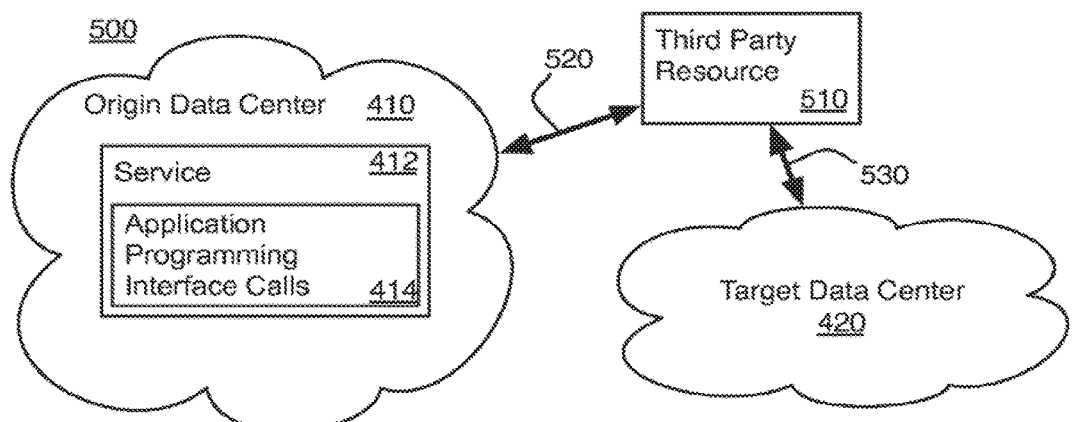
FIG. 5 illustrates a block diagram of an example system for providing an application programming interface testing service.

FIG. 5 illustrates a block diagram of an example system 500 for providing an application programming interface testing service, arranged in accordance with at least some embodiments of the present disclosure. As shown, system 500 may include origin data center 410 having service 412 including application programming interface calls 414, as discussed with respect to FIG. 4 and elsewhere herein. System 500 may also include target data center 420, as discussed with respect to FIG. 4 and elsewhere herein. System 500 may also include a third party resource 510 in communication with origin data center 410 by a connection 520 and in communication with target data center 420 by a connection 530.

In general, third party resource 510 may include any suitable computing device or devices. In some examples, third party resource 510 may include computers, servers, server systems, data storage systems, telecommunications systems, computing clusters, and/or ancillary environmental systems, or the like. As shown, third party resource 510 may be in communication with origin data center 410 via connection 520 and in communication with target data center 420 via connection 530. In general, connections 520, 530 may include any suitable communication connections. In some examples, one or both communicative connections may include a virtual private network (VPN) tunnel. In some examples, one or both communicative connections may include a management connection. In some examples, one or both communicative connections may be over the internet.

As discussed herein, in some examples, an application programming interface testing service may be provided. In some examples, the application programming interface testing service may be provided by third party resource 510. For example, application programming interface calls 414 used by service 412 may be determined at origin data center 410 via software or commands provided by third party resource 510 and using any of the techniques discussed herein, such as, for example, extraction from captured messages at a network processor (as discussed with respect to FIG. 2) and/or by evaluating a code repository (as discussed with respect to FIG. 3). In some examples, the application programming interface calls may be converted to test segments, an application programming interface test module may be formed, the application programming interface test module may be transmitted, and test results may be received at third party resource 510. In some examples, third party resource 510 may be managed and/or operated by a party that provides information or support or the like for customers to transfer between data centers. In some examples, third party resource 510 may be managed and/or operated by a data center or cloud services broker, or the like.

FIG. 6 illustrates an example computer program product 600, arranged in accordance with at least some embodiments of the present disclosure. Computer program product 600 may include machine readable non-transitory medium having stored therein a plurality of instructions that, when executed, cause the machine to provide an application programming interface testing service according to the processes and methods discussed herein. Computer program product 600 may include a signal bearing medium 602. Signal bearing medium 602 may include one or more machine-readable instructions 604, which, when executed by one or more processors, may operatively enable a computing device to provide the functionality described herein. In various examples, some or all of the machine-readable instructions may be used by the devices discussed herein.

In some examples, the machine readable instructions 604 may include instructions that, when executed, cause a device to provide an application programming interface testing service by determining a plurality of application programming interface calls used by a service at an origin data center. In some examples, the machine readable instructions 604 may include instructions that, when executed, cause a device to provide an application programming interface testing service by converting each of the plurality of application programming interface calls into a test segment to generate a plurality of test segments. In some examples, the machine readable instructions 604 may include instructions that, when executed, cause a device to provide an application programming interface testing service by forming an application programming interface test module for a target data center, the application programming interface test module including each of the plurality of test segments. In some examples, the machine readable instructions 604 may include instructions that, when executed, cause a device to provide an application programming interface testing service by transmitting the application programming interface test module to the target data center for execution at the target data center. In some examples, the machine readable instructions 604 may include instructions that, when executed, cause a device to provide an application programming interface testing service by receiving one or more test results based at least in part on the transmitted application programming interface test module being executed at the target data center. In some examples, the machine readable instructions 604 may include instructions that, when executed, cause a device to provide an application programming interface testing service by transmitting the application programming interface test module to the target data center for execution at the target data center. In some examples, the machine readable instructions 604 may include instructions that, when executed, cause a device to provide an application programming interface testing service by receiving one or more test results based at least in part on the transmitted application programming interface test module being executed at the target data center, wherein the application programming interface test module includes a hypertext transfer protocol put request and the one or more test results includes an indication that the hypertext transfer protocol get request was successful. In some examples, the machine readable instructions 604 may include instructions that, when executed, cause a device to provide an application programming interface testing service by comparing the one or more test results to one or more second test results received from a second target data center.

In some implementations, signal bearing medium 602 may encompass a computer-readable medium 606, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communication link, a wireless communication link, etc.). In some examples, signal bearing medium 602 may encompass a machine readable non-transitory medium.

Figure 7:
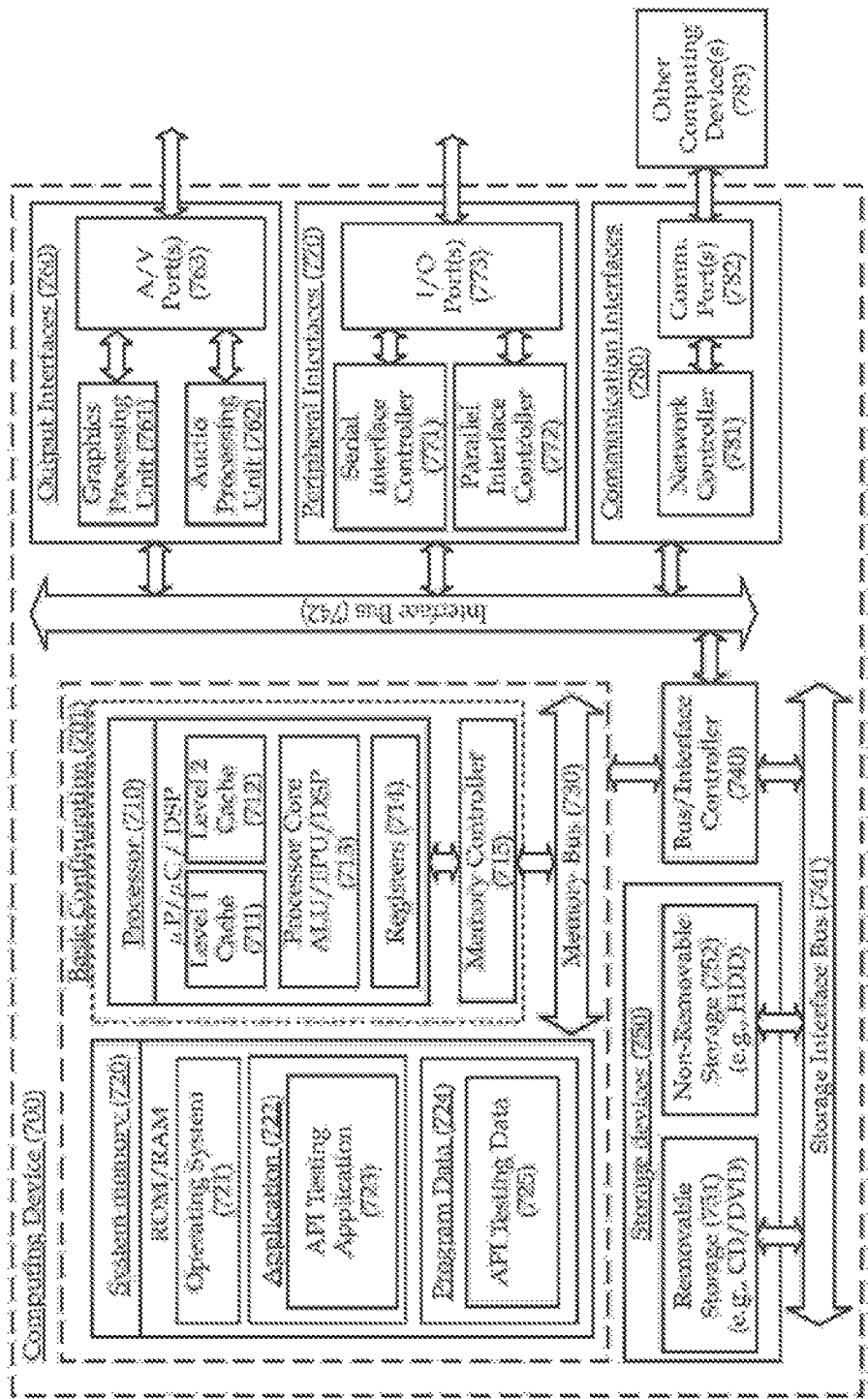
FIG. 7 illustrates a block diagram of an example computing device, all arranged in accordance with at least some embodiments of the present disclosure.

FIG. 7 is a block diagram illustrating an example computing device 700, arranged in accordance with at least some embodiments of the present disclosure. In various examples, computing device 700 may be configured to provide application programming interface testing services as discussed herein. In one example basic configuration 701, computing device 700 may include one or more processors 710 and system memory 720. A memory bus 730 can be used for communicating between the processor 710 and the system memory 720.

Depending on the desired configuration, processor 710 may be of any type including but not limited to a microprocessor (µP), a microcontroller (µC), a digital signal processor (DSP), or any combination thereof. Processor 710 can include one or more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 may be of any type including but not limited to volatile memory (such as RAM), non-volatile memory (such as ROM, flash memory, etc.) or any combination thereof. System memory 720 may include an operating system 721, one or more applications 722, and program data 724. Application 722 may include API testing application 723 that can be arranged to perform the functions, actions, and/or operations as described herein including the functional blocks, actions, and/or operations described herein. Program Data 724 may include API testing data 725 for use with API testing application 723. In some example embodiments, application 722 may be arranged to operate with program data 724 on an operating system 721. This described basic configuration is illustrated in FIG. 7 by those components within dashed line 701.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 742 for facilitating communication from various interface devices (e.g., output interfaces, peripheral interfaces, and communication interfaces) to the basic configuration 701 via the bus/interface controller 740. Example output interfaces 760 may include a graphics processing unit 761 and an audio processing unit 762, which may be configured to communicate to various external devices such as a display or speakers via one or more A/V ports 763. Example peripheral interfaces 770 may include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which may be arranged to facilitate communications with one or more other computing devices 783 over a network communication via one or more communication ports 782. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 700 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. Computing device 700 may also be implemented as a personal computer including both laptop computer and non-laptop computer configurations. In addition, computing device 700 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claimed subject matter containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method to provide an application programming interface (API) testing service, the method comprising:
   generating a plurality of test segments based on a plurality of API calls;
   creating an API test module that includes the plurality of test segments;
   transmitting, via a communication network, the API test module to a plurality of data centers that comprises a first data center and a second data center;
   receiving test results from the plurality of data centers, wherein the received test results comprise a first set of test results based on the transmitted API test module that is executed on the first data center, and comprise a second set of test results based on the transmitted API test module that is executed on the second data center, and wherein the first set of test results and the second set of test results are indicative of whether execution of each respective one of the plurality of test segments is successful or returns an error;
   comparing the first set of test results and the second set of test results; and
   generating a report based on the comparison, wherein the report indicates which of the plurality of API calls are compatible with the plurality of data centers.

2. The method of claim 1, wherein the plurality of API calls comprises at least one of: a hypertext transfer protocol (HTTP) get request, a HTTP put request, a key-value store command, a messaging call, a queuing call, a remote storage call, a delivery to a content delivery network request, or a management command to a content delivery network.

3. The method of claim 1, further comprising:
   receiving, based on the transmitted API test module that is executed at the plurality of data centers, a test report that includes a test result for each of the plurality of test segments.

4. The method of claim 1, wherein generating the plurality of test segments comprises generating an API setup call.

5. The method of claim 1, wherein generating the plurality of test segments comprises generating an API call within an error detection loop that is configured to record whether the generated API call executed correctly or returned an error, and wherein the error detection loop comprises at least one of a header and a footer.

6. The method of claim 1, wherein the API test module is configured to cycle through each of the plurality of test segments at the plurality of data centers.

7. The method of claim 1, further comprising:
   capturing a first in-operation network message at a network processor of an origin data center;
   extracting a first API call from the first in-operation network message; and
   including the first API call in the plurality of API calls.

8. The method of claim 1, further comprising:
   capturing a first simple object access protocol message at a network processor of an origin data center;
   extracting a first API call from the first simple object access protocol message; and
   including the first API call in the plurality of API calls.

9. The method of claim 1, further comprising:
   snooping network messages for API calls at a network processor of an origin data center to detect a first message that includes a first API call and to detect a second message that includes a second API call;
   determining whether the first API call and the second API call are similar;
   including the first API call in the plurality of API calls based on a determination that the first API call and the second API call are similar; and
   including the first API call and the second API call in the plurality of API calls based on a determination that the first API call and the second API call are dissimilar.

10. The method of claim 1, further comprising:
    evaluating a code repository to detect a code-level API call; and
    including the code-level API call in the plurality of API calls.

11. A non-transitory computer-readable medium that includes computer executable instructions that, in response to execution by a processor, cause a device to perform or control performance of operations to provide an application programming interface (API) testing service, wherein the operations comprise:
    generate a plurality of test segments based on a plurality of API calls;
    create an API test module that includes the plurality of test segments;
    send, via a communication network, the API test module to a plurality of data centers that comprises a first data center and a second data center;
    obtain test results from the plurality of data centers, wherein the obtained test results comprise a first set of test results based on the sent API test module that is executed on the first data center, and comprise a second set of test results based on the sent API test module that is executed on the second data center, and wherein the first set of test results and the second set of test results are indicative of whether execution of each respective one of the plurality of test segments is successful or returns an error;
    compare the first set of test results and the second set of test results; and
    generate a report based on the comparison, wherein the report indicates which of the plurality of API calls are compatible with the plurality of data centers.

12. The non-transitory computer-readable medium of claim 11, wherein the operations to generate the plurality of test segments comprise at least one operation to generate an API setup call.

13. The non-transitory computer-readable medium of claim 11, wherein the operations to generate the plurality of test segments comprise operations to generate an API call within an error detection loop that is configured to record whether the generated API call executed correctly or returned an error, and wherein the error detection loop comprises at least one of a header and a footer.

14. The non-transitory computer-readable medium of claim 11, wherein the operations further comprise:
    snoop network messages for API calls at a network processor of an origin data center to detect a first message that includes a first API call and to detect a second message that includes a second API call;
    determine whether the first API call and the second API call are similar;
    include the first API call in the plurality of API calls based on a determination that the first API call and the second API call are similar; and include the first API call and the second API call in the plurality of API calls based on a determination that the first API call and the second API call are dissimilar.

15. The non-transitory computer-readable medium of claim 11, wherein the operations further comprise:
capture a first in-operation network message at a network processor of an origin data center;
extract a first API call from the first in-operation network message; and
include the first API call in the plurality of API calls.

16. The non-transitory computer-readable medium of claim 11, wherein the operations further comprise:
capture a first simple object access protocol message at a network processor of an origin data center;
extract a first API call from the first simple object access protocol message; and
include the first API call in the plurality of API calls.

17. The non-transitory computer-readable medium of claim 11, wherein the operations further comprise:
evaluate a code repository to detect a code-level API call; and
include the code-level API call in the plurality of API calls.

18. An application programming interface (API) testing device, comprising:
a processor; and
a machine readable medium coupled to the processor and having instructions stored thereon that, in response to execution by the processor, cause the API testing device to perform operations to provide an API testing service, wherein the operations comprise:
generate a plurality of test segments based on a plurality of API calls;
create an API test module that includes the plurality of test segments;
send, via a communication network, the API test module to a plurality of data centers that comprises a first data center and a second data center;
obtain test results from the plurality of data centers, wherein the obtained test results comprise a first set of test results based on the sent API test module that is executed on the first data center, and comprise a second set of test results based on the sent API test module that is executed on the second data center, and wherein the first set of test results and the second set of test results are indicative of whether execution of each respective one of the plurality of test segments is successful or returns an error;
compare the first set of test results and the second set of test results; and
generate a report based on the comparison, wherein the report indicates which of the plurality of API calls are compatible with the plurality of data centers.

19. The API testing device of claim 18, wherein the operations further comprise:
snoop network messages for API calls at a network processor of an origin data center to detect a first message that includes a first API call and to detect a second message that includes a second API call;
determine whether the first API call and the second API call are similar;
include the first API call in the plurality of API calls based on a determination that the first API call and the second API call are similar; and
include the first API call and the second API call in the plurality of API calls based on a determination that the first API call and the second API call are dissimilar.

20. The API testing device of claim 18, wherein the operations further comprise:
capture a first in-operation network message at a network processor of an origin data center;
extract a first API call from the first in-operation network message; and
include the first API call in the plurality of API calls.

21. The API testing device of claim 18, wherein the operations further comprise:
capture a first simple object access protocol message at a network processor of an origin data center;
extract a first API call from the first simple object access protocol message; and
include the first API call in the plurality of API calls.

* * * * *